(12) United States Patent
Lee et al.

(10) Patent No.: US 7,440,700 B2
(45) Date of Patent: Oct. 21, 2008

(54) APPARATUS FOR TESTING PERFORMANCE OF OPTICAL TRANSCEIVER

(75) Inventors: Jyung Chan Lee, Daejeon (KR); Joon Ki Lee, Daejeon (KR); Hyun Jae Lee, Daejeon (KR); Kwangjoon Kim, Daejeon (KR)

(73) Assignee: Electronics and Telecommunications Research Institute (KR)

( * ) Notice: Subject to any disclaimer, the term of this patent is extended or adjusted under 35 U.S.C. 154(b) by 457 days.

(21) Appl. No.: 11/134,202

(22) Filed: May 20, 2005

(65) Prior Publication Data

US 2006/0133812 A1 Jun. 22, 2006

(30) Foreign Application Priority Data

Dec. 17, 2004 (KR) ...................... 10-2004-0108148

(51) Int. Cl.
H04B 10/00 (2006.01)
(52) U.S. Cl. .................... 398/135; 398/140; 398/154; 398/155; 398/9; 398/14; 398/16; 398/25; 398/30
(58) Field of Classification Search ................ 398/9, 398/12, 14, 16, 22–24, 34, 37, 128–155, 398/177, 30; 370/216, 516, 537; 331/1 A; 327/296; 377/20; 326/93
See application file for complete search history.

(56) References Cited

U.S. PATENT DOCUMENTS 6,430,201 B1 8/2002 Azizoglu et al.
6,452,421 B2 * 9/2002 Saito ............................ 326/93
6,631,144 B1 * 10/2003 Johansen ..................... 370/516
6,665,367 B1 * 12/2003 Blair ............................ 377/20
6,970,030 B1 * 11/2005 Huang et al. ................ 327/296
2002/0021468 A1 * 2/2002 Kato et al. ................... 359/152
2002/0167897 A1 * 11/2002 Tateno et al. ................ 370/216
2003/0038681 A1 * 2/2003 Djafari et al. ............... 331/1 A
2003/0067656 A1 * 4/2003 Gentile ........................ 359/158
2004/0136411 A1 * 7/2004 Hornbuckle et al. ......... 370/537

FOREIGN PATENT DOCUMENTS

KR 1020020053546 A 7/2002

* cited by examiner

Primary Examiner—Kenneth Vanderpuye
Assistant Examiner—Li Liu
(74) Attorney, Agent, or Firm—Blakely, Sokoloff, Taylor & Zafman

(57) ABSTRACT

Provided is an apparatus for testing the performance of an optical transceiver by referencing various performance clocks provided by an OTU2 signal connection transceiver and an STM-64/OC-192 signal. The apparatus for testing performance of an optical transceiver includes: a transmitter/receiver reference clock selector for selecting one of various transmitter/receiver reference clocks provided by an STM-64/OC-192 connection optical transceiver or an OTN connection optical transceiver; a transmitter test reference clock selection switch for selecting a receiver data synchronous clock provided by the transceivers or the selected transmitter/receiver reference clock as a transmitter test reference clock; and a receiver test reference clock selection switch for selecting a transmitter supervisory clock provided by the transceivers or the selected transmitter/receiver reference clock as a receiver test reference clock.

2 Claims, 3 Drawing Sheets

APPARATUS FOR TESTING PERFORMANCE OF OPTICAL TRANSCEIVER

BACKGROUND OF THE INVENTION

This application claims the benefit of Korean Patent Application No. 10-2004-0108148, filed on Dec. 17, 2004 in the Korean Intellectual Property Office, the disclosure of which is incorporated herein in its entirety by reference.

1. Field of the Invention

The present invention relates to an apparatus for testing the performance of an optical transceiver, and more particularly, to an apparatus for testing the performance of an optical transceiver by referencing various performance clocks provided by an OTU2 signal connection transceiver and an STM-64/OC-192 signal which are included in the optical transponder.

2. Description of the Related Art

FIG. 1 is a block diagram illustrating a conventional WDM (Wavelength Division Multiplexing) optical transmission device for connecting various client network signals. The WDM optical transmission device multiplexes and transmits several signals at different wavelengths to one optical fiber in an optical transport network (OTN), thereby increasing efficiency of a bandwidth of an optical fiber line, i.e., a transmission volume.

The WDM optical transmission device comprises an optical channel unit 120 connected to an external client network 110, an optical multiplexer 130 for multiplexing several signals of different wavelengths of the optical channel unit 120, an optical amplifier 140 for amplifying the multiplexed optical signal, an optical transmission line 141 for transmitting an optical signal, and an optical demultiplexer 150 for demultiplexing the transmitted signal.

The WDM optical transmission device receives a tributary signal such as a SDH/SONET signal 111 including an STM-16/OC-48 signal and an STM-64/OC-192 signal, a GbE (Gigibit Ethernet) signal 112 including a 10 GbE signal, and a SAN (Storage Area Network) signal including an FC (Fiber Channel) signal and an ESCON (Enterprise Systems CONnectivity) signal. "# n" of an optical transponder 121 denotes the maximum number of optical channels received by the WDM optical transmission device and has the values 8, 16, 32, 40, 160, etc.

The optical transponder 121 included in the optical channel unit 120 interconnects a client network having an SDH (Synchronous Digital Hierarchy)/SONET (Synchronous Optical Network) STM-64/OC-192 signal (9.953 Gb/s) with an OTN having an OTU2 (Optical Channel Transport Unit 2) signal (10.709 Gb/s). A conventional optical transponder in the WDM optical transmission device has been used to receive an SDH/SONET signal such as an STM-16/OC-48 signal, an STM-64/OC-192 signal, etc.

Nowadays, the demand for a connection reference of various tributary signals such as GbE signals, FC signals, ESCON signals, etc. has increased due to an increase of data communication traffic.

As the transmission speed of the WDM optical transmission device has increases from 2.5 Gb/s to 10 Gb/s, four STM-16/OC-48 signals are multiplexed or a plurality of GbE signals are multiplexed as a 10 Gb/s OTN (OTU2) signal for transmission in order to effectively operate the optical channel of the WDM optical transmission device.

With respect to the development and the operation of optical transceivers 200 and 210, since it is possible to test the optical transceivers 200 and 210 only when a digital wrapper unit 230 and a supervisory controller 240 are simultaneously embodied, there is a problem in guaranteeing the performance of the optical transceivers 200 and 210.

SUMMARY OF THE INVENTION

The present invention provides an apparatus for independently testing the performance of an optical transceiver although a digital wrapper and a supervisory controller are not simultaneously embodied.

The present invention provides a method of testing the performance of the optical transceiver based on a clock selected among various clocks provided by the optical transceiver. In this case, diverse clock selections make it possible to test the performance of the optical transceiver in its diverse aspects.

According to an aspect of the present invention, there is provided an apparatus for testing the performance of an optical transceiver, comprising: a transmitter/receiver reference clock selector for selecting one of various transmitter/receiver reference clocks provided by an STM-64/OC-192 connection optical transceiver or an OTN connection optical transceiver; a transmitter test reference clock selection switch for selecting a receiver data synchronous clock provided by the transceivers or the selected transmitter/receiver reference clock as a transmitter test reference clock; and a receiver test reference clock selection switch for selecting a transmitter supervisory clock provided by the transceivers or the selected transmitter/receiver reference clock as a receiver test reference clock.

BRIEF DESCRIPTION OF THE DRAWINGS

The above features and advantages of the present invention will become more apparent by describing in detail exemplary embodiments thereof with reference to the attached drawings in which.

DETAILED DESCRIPTION OF THE INVENTION

Figure 1:
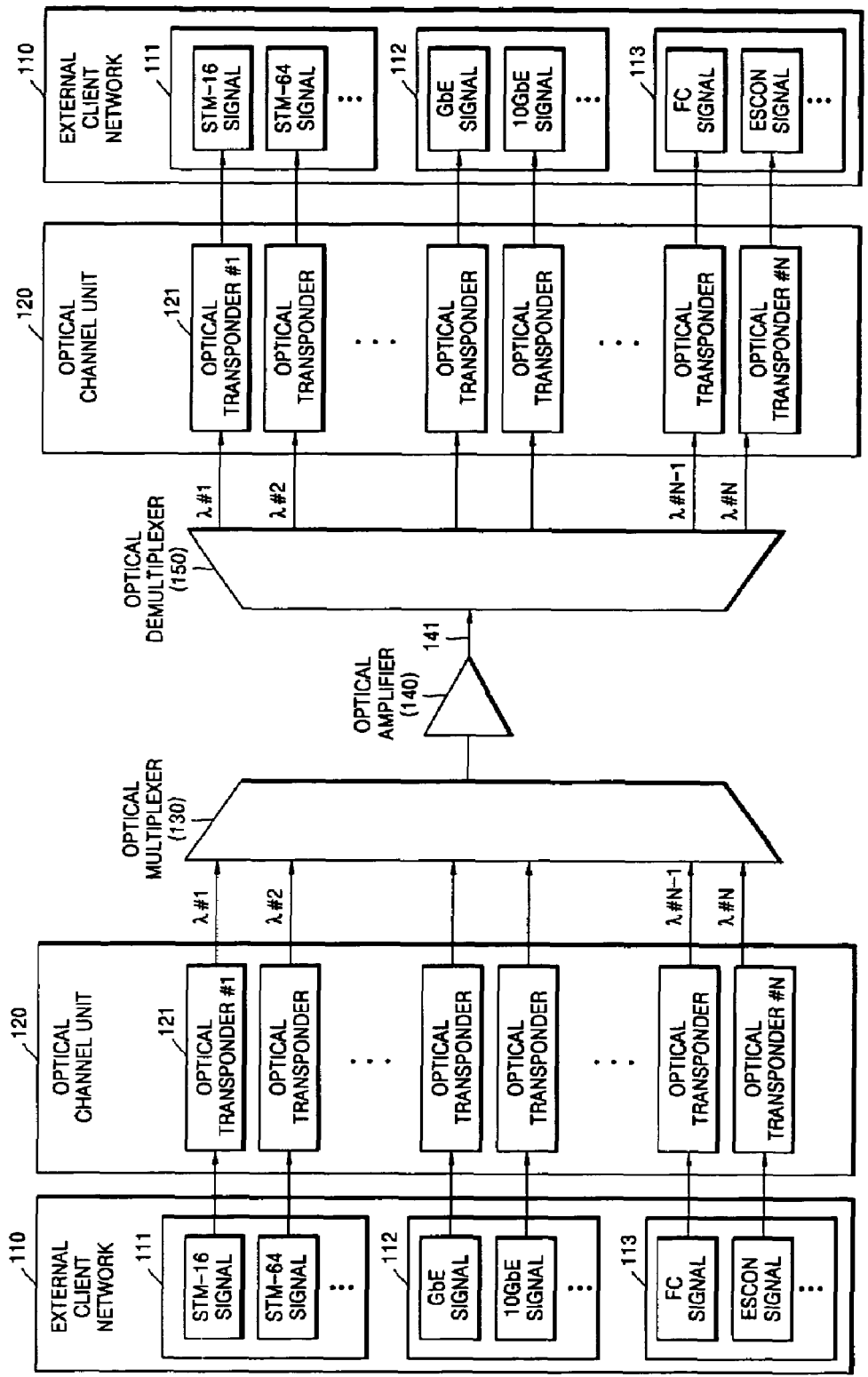
FIG. 1 is a block diagram illustrating a conventional WDM (Wavelength Division Multiplexing) optical transmission device for connecting various client network signals.

The present invention will now be described more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those skilled in the art. Like reference numerals in the drawings denote like elements.

Figure 2:
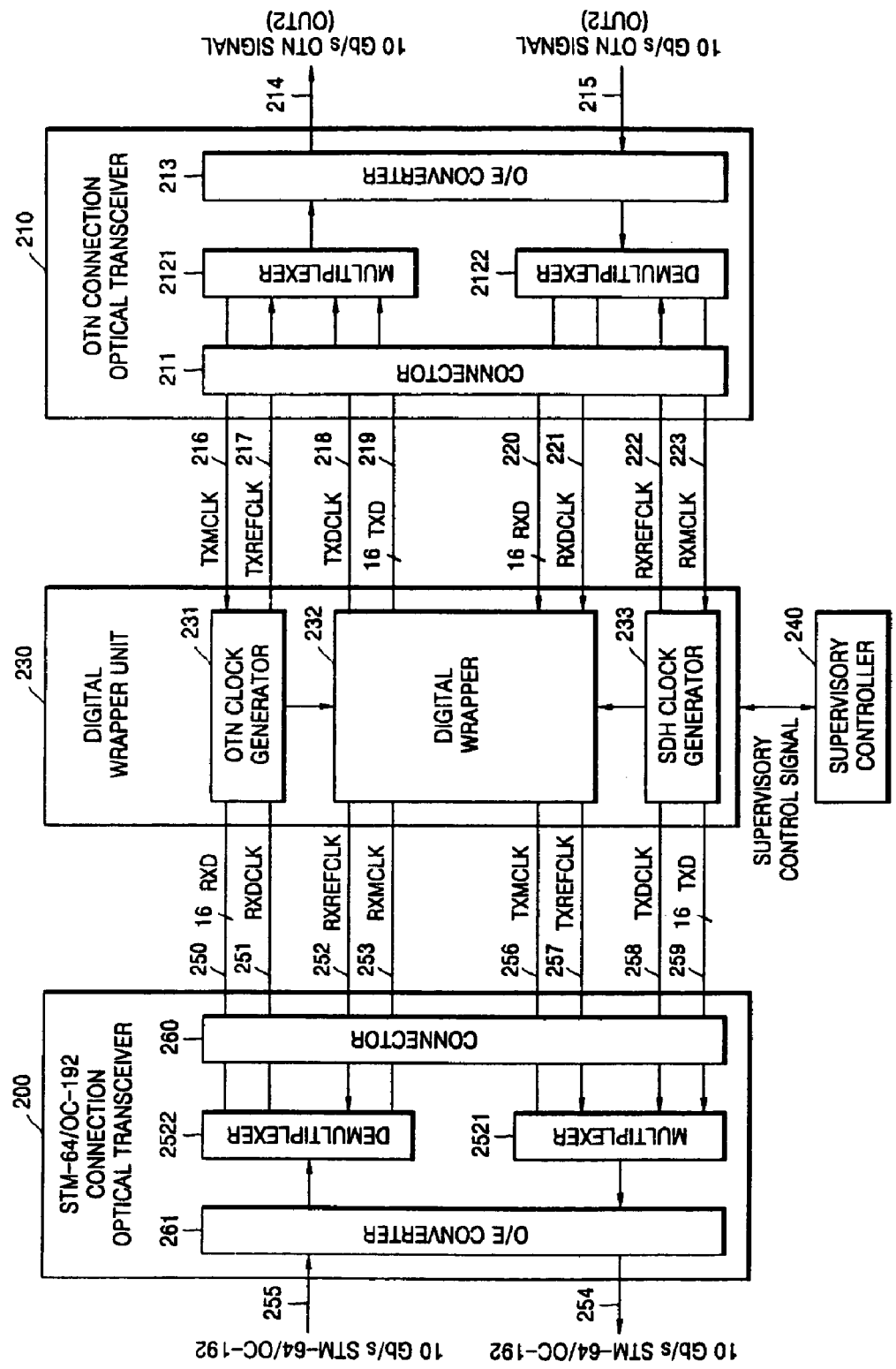
FIG. 2 is a block diagram illustrating an optical transponder of the WDM optical transmission device according to an embodiment of the present invention.

FIG. 2 is a block diagram illustrating an optical transponder of the WDM optical transmission device according to an embodiment of the present invention. Referring to FIG. 2, the optical transponder that receives STM-64/OC-192 optical signals 254 and 255 of an external client network 110 and OTU2 signals 214 and 215 of an OTN comprises an STM-64/OC-192 connection optical transceiver 200, an OTN connection optical transceiver 210, a digital wrapper unit 230, and a supervisory controller 240.

The STM-64/OC-192 connection optical transceiver 200 inputs/outputs the STM-64/OC-192 optical signals 254 and 255 comprises an O/E converter 261, a multiplexer 2521, and a demultiplexer 2522. The O/E converter 261 O/E or E/O converts the STM-64/OC-192 optical signals 254 and 255. The multiplexer 2521 and the demultiplexer 2522 receives/transmits a 9.958 Gb/s serial electrical signal from/to the digital wrapper unit 230 through a connector 251 including 16.times.622 Mbps parallel data synchronous clocks 259 and 250, 622 MHz data synchronous clocks 258 and 251, supervisory clocks 256 and 253, and reference clocks 257 and 252.

The digital wrapper unit 230 maps or demaps the STM-64/OC-192 optical signals 254 and 255 to the OTU2 signals 214 and 215 comprises an OTN clock generator 231, an SDH clock generator 233, and a digital wrapper 232. The OTN clock generator 231 generates a mapping clock and the SDH clock generator 233 generates a demapping clock. The digital wrapper 232 maps the STM-64/OC-192 optical signals 254 and 255 to the OTU2 signals 214 and 215 or demaps the OTU2 signals 214 and 215 to the STM-64/OC-192 optical signals 254 and 255.

The supervisory controller 240 controls each function of the STM-64/OC-192 connection optical transceiver 200, the OTN connection optical transceiver 210, and the digital wrapper unit 230 and supervises their performance and errors.

The OTN connection optical transceiver 210 inputs/outputs the 10.709 Gb/s OTU2 signals 214 and 215 comprises a multiplexer 2121, a demultiplexer 2122, and an O/E converter 213. The multiplexer 2121 and the demultiplexer 2122 receives/transmits a 10.907 Gb/s serial electrical signal from/to the digital wrapper unit 230 through a connector 211 including 16×669 Mbps parallel data synchronous clocks 219 and 220, 669 MHz data synchronous clocks 218 and 221, supervisory clocks 216 and 223, and reference clocks 217 and 222.

The STM-64/OC-192 connection optical transceiver 200 and the OTN connection optical transceiver 210 include 300 pin MSA (Multi-Source Agreement) reference connectors 260 and 211 that are used to exchange sixteen parallel data, one clock signal, and a supervisory control signal and supply power required for the optical transceiver. Such a signal exchange using the 300 pin MSA reference connectors 260 and 211 is based on an SFI-4 (Serdes Framer Interface Level 4) connection standard suggested by the OIF (Optical Internetworking Forum).

Figure 3:
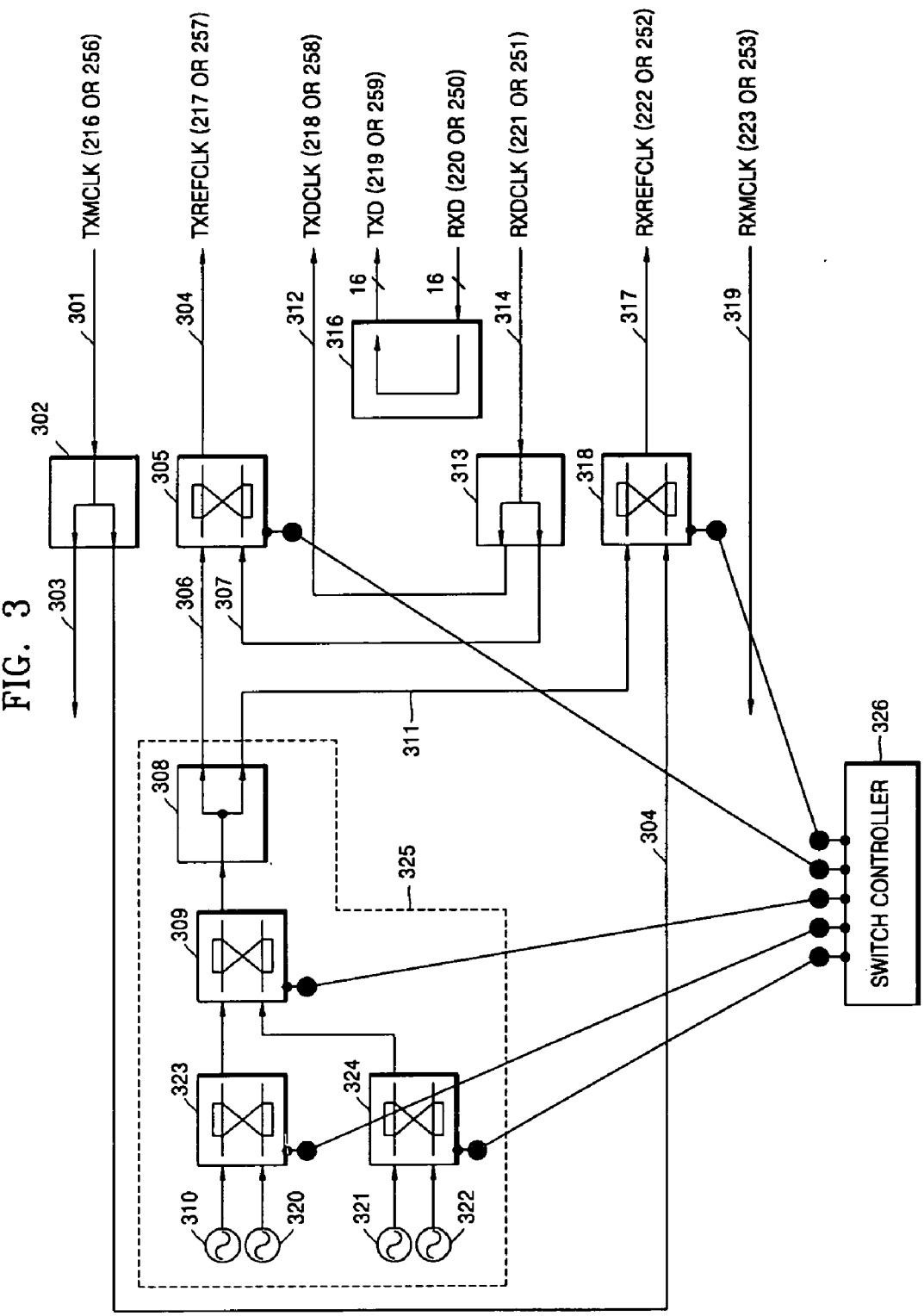
FIG. 3 illustrates an apparatus for testing the performance of an STM-64/OC-192 connection optical transceiver or an OTN connection optical transceiver shown in FIG. 2 according to an embodiment of the present invention.

FIG. 3 illustrates an apparatus for testing the performance of the STM-64/OC-192 connection optical transceiver or the OTN connection optical transceiver shown in FIG. 2 according to an embodiment of the present invention.

Transmitter signals TX through the connectors 260 and 211 included in the STM-64/OC-192 connection optical transceiver 200 and the OTN connection optical transceiver 210 are transmitter data TXD 219 and 259, transmitter data synchronous clocks TXDCLK 218 and 258, transmitter supervisory clocks TXMCLK 216 and 256, and transmitter reference clocks TXREFCLK 217 and 257.

Receiver signals RX through the connectors 260 and 211 included in the STM-64/OC-192 connection optical transceiver 200 and the OTN connection optical transceiver 210 are receiver data RXD 220 and 250, receiver data synchronous clocks RXDCLK 221 and 251, receiver supervisory clocks RXMCLK 223 and 253, and receiver reference clocks RXREFCLK 222 and 252. The transmitter/receiver data TXD and RXD are 16-bit parallel data.

Suppose that the receiver/transmitter signals are received from and transmitted to the digital wrapper unit 230. To this end, the present invention includes signal lines and various blocks 301 through 319.

The apparatus for testing the performance of the optical transceiver comprises a transmitter/receiver data connector 316 for connecting receiver data RXD 220 and 250 to the transmitter data TXD 219 and 259, a transmitter supervisory clock separator 302 for separating the transmitter supervisory clocks TXMCLK 216 and 256 into 1×2, a receiver data synchronous clock separator 313 for separating the receiver data synchronous clocks RXDCLK 221 and 251 into 1×2, a transmitter test reference clock selection switch 305 for selecting the transmitter test reference clocks TXREFCLK 217 and 257, a receiver test reference clock selection switch 318 for selecting the receiver test reference clocks RXREFCLK 222 and 252, and a transmitter/receiver reference clock selector 325 for providing a transmitter/receiver reference clock.

The transmitter test reference clock selection switch 305 is connected to an output 306 of the transmitter/receiver reference clock selector 325 and an output 307 of the receiver data synchronous clock separator 313 and selects a clock to be used as the transmitter test reference clocks TXREFCLK 217 and 257.

The receiver test reference clock selection switch 318 is connected to an output 311 of the transmitter/receiver reference clock selector 325 and an output 304 of the transmitter supervisory clock separator 302 and selects a clock to be used as the receiver reference clocks RXREFCLK 222 and 252.

The STM-64/OC-192 connection optical transceiver 200 and the OTN connection optical transceiver 210 use one of various transmitter/receiver reference clocks, 622 MHz, 669 MHz, 155 MHz, and 167 MHz. To this end, the transmitter/receiver reference clock selector 325 selects one of various transmitter/receiver reference clocks in order to provide one reference clock for the transmitter test reference clock selection switch 305 and the receiver test reference clock selection switch 318 using a clock separator 308 and switches 323, 324, and 309 composed of various outputs, 622 MHz, 669 MHz, 155 MHz, and 167 MHz, of the transmitter/receiver reference clock generators 310, 320, 321, and 322 as multistage switches.

The transmitter test reference clock selection switch 305 switches to select which output is used as the transmitter test reference clock between the output 306 of the transmitter/receiver reference clock selector 325 and the output 307 of the receiver data synchronous clock separator 313 that separates the receiver data synchronous clocks RXDCLK 221 and 251 into 1×2.

The receiver test reference clock selection switch 318 switches to select which output is used as the receiver test reference clock between the output 306 of the transmitter/receiver reference clock selector 325 and the output 304 of the transmitter supervisory clock separator 302 that separates the transmitter supervisory clocks TXMCLK 216 and 256 into 1×2.

Other lines are used to connect input signals and output signals of the separators 302, 308, and 313, the switches 305, 318, 323, 324, and 309, and clock generators. A switch controller 326 for controlling switching operations of the switches 305, 318, 323, 324, and 309 is included.

A method of testing the performance of the optical transceiver used by the apparatus for testing performance of the optical transceiver is described with reference to FIGS. 2 and 3.

The transmitter reference clocks TXREFCLK 217 and 257 and the receiver reference clocks RXREFCLK 222 and 252 of the optical transceiver generated by the transmitter/receiver reference clock generators 310, 320, 321, and 322 are input to the transmitter reference clock switch 323 and the receiver reference clock switch 324, respectively. The transmitter reference clock switch 323 switches one clock generated by the transmitter reference clock 622 MHz generator 310 and the transmitter reference clock 669 MHz generator 320, and the receiver reference clock switch 324 switches one clock generated by the receiver reference clock 155 MHz generator 321 and the receiver reference clock 167 MHz generator 322.

The transmitter/receiver reference clock switch 309 receives the transmitter reference clock and the receiver reference clock switched by the transmitter reference clock switch 323 and the receiver reference clock switch 324, respectively, switches the transmitter reference clock or the receiver reference clock, and selects one transmitter/receiver reference clock.

In a first classification, whether to test the STM-64/OC-192 connection optical transceiver 200 or the OTN connection optical transceiver 210 is based on a selection reference of the transmitter/receiver reference clock selector 325 to output a clock of which frequency among various outputs, 622 MHz, 669 MHz, 155 MHz, and 167 MHz, of the transmitter/receiver reference clock generators 310, 320, 321, and 322.

To be more specific, since the STM-64/OC-192 connection optical transceiver 200 has input/output data 255 and 254 of 9.953 Gbps, it uses a 622 MHz or 155 MHz clock frequency which is 1/16 or 1/64 of 9.953 Gbps as the transmitter/receiver test reference clocks 257 and 252. Since the OTN connection optical transceiver 210 has input/output data 214 and 215 of 10.709 Gbps, it uses a 669 MHz or 167 MHz clock frequency which is 1/16 or 1/64 of 10.709 Gbps as the transmitter/receiver test reference clocks TXREFCLK 217 and 222.

A second classification depends on whether the transmitter reference clocks TXREFCLK 217 and 257 and the receiver reference clocks RXREFCLK 222 and 252 of an optical transceiver to be tested use 1/16 input/output data or 1/64 input/output data.

To be more specific, the STM-64/OC-192 connection optical transceiver 200 uses 622 MHz clock frequency or 155 MHz clock frequency as the transmitter reference clocks TXREFCLK 217 and 257 and the receiver reference clocks RXREFCLK 222 and 252 according to an optical transceiver to be tested. The OTN connection optical transceiver 210 uses 669 MHz clock frequency or 167 MHz clock frequency according to the transmitter reference clocks TXREFCLK 217 and 257 and the receiver reference clocks RXREFCLK 222 and 252 of an optical transceiver.

When the STM-64/OC-192 connection optical transceiver 200 is tested, the transmitter reference clock switch 323 becomes an output of the transmitter reference clock 622 MHz generator 310, and the receiver reference clock switch 324 becomes an output of the receiver reference clock 155 MHz generator 321.

If the STM-64/OC-192 connection optical transceiver 200 uses 155 MHz clock frequency as the transmitter reference clocks TXREFCLK 217 and 257 and the receiver reference clocks RXREFCLK 222 and 252, the transmitter/receiver reference clock switch 309 is switched to an output of the receiver reference clock switch 324. By doing this, test reference clocks to be provided for the transmitter reference clocks TXREFCLK 217 and 257 and the receiver reference clocks RXREFCLK 222 and 252 are selected.

The selected transmitter/receiver reference clocks are input to the transmitter test reference clock selection switch 305 and the receiver test reference clock selection switch 318 via the 1×2 clock separator 308 (a first separator).

The transmitter test reference clock selection switch 305 and the receiver test reference clock selection switch 318 select the clock selected by the transmitter/receiver reference clock selector 325, or the transmitter supervisory clocks TXMCLK 216 and 256 and the receiver data synchronous clocks RXDCLK 221 and 251 as a test reference clock according to a tester's selection.

One of the outputs of the receiver data synchronous clock separator 313 (a second separator) that separates the receiver data synchronous clocks RXDCLK 221 or 251 into 1.times.2 received from an external device (the optical transceiver) is connected 307 to an input terminal of the transmitter test reference clock selection switch 305 and determined to be used as the transmitter test reference clocks TXREFCLK 217 and 257 according to a switching of the transmitter test reference clock selection switch 305. Another output 312 of the second separator 313 is directly used as the transmitter data synchronous clocks TXDCLK 218 and 258.

One of the outputs of the transmitter supervisory clock separator 302 (a third separator) that separates the transmitter supervisory clocks TXMCLK 216 or 256 into 1×2 received from an external device (the optical transceiver) has a connection line 303 to monitor the transmitter supervisory clocks TXMCLK 216 and 256. Another output 304 of the third separator 302 is connected to an input terminal of the receiver test reference clock selection switch 318 and determined to be used as the receiver test reference clocks RXREFCLK 222 and 252 according to a switching of the receiver test reference clock selection switch 318.

The receiver supervisory clocks RXMCLK 223 and 253 received from outside are monitored using a connection line 319. The switching controller 326 controls switching of the above switches and supervises analog signal information of the optical transceiver.

An apparatus for testing the performance of the optical transceiver provided by the present invention selects one of various clocks provided by an optical transceiver and tests the performance of the optical transceiver based on the selected clock, thereby simplifying a test process. In addition, diverse clock selections make it possible to test the performance of the optical transceiver in its diverse aspects, thereby guaranteeing the performance of the optical transceiver.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An apparatus for testing the performance of an optical transceiver comprising:

a transmitter/receiver reference clock selector for selecting one of a plurality transmitter reference clocks or one of a plurality of receiver reference clocks provided by an a first transceiver and a second transceiver;

a transmitter test reference clock selection switch for selecting one of a receiver data synchronous clock provided by an external device and the selected transmitter or receiver reference clock as a transmitter test reference clock; and a receiver test reference clock selection switch for selecting one of a transmitter supervisory clock provided by an external device and the selected transmitter/receiver reference clock as a receiver test reference clock;

a first separator for separating the selected transmitter or receiver reference clock into an input to the transmitter test reference clock selection switch and the receiver test reference clock selection switch;

a second separator for separating the receiver data synchronous clock into an input to the transmitter test reference clock selection switch and a transmitter data synchronous clock; and a third separator for separating the transmitter supervisory clock into an input to the receiver test reference clock selection switch and an external monitoring connection line of the transmitter supervisory clock.

2. The apparatus of claim 1, wherein the transmitter/receiver reference clock selector comprises:

a reference clock generator for generating two transmitter reference clocks and two receiver reference clocks provided by the first and second transceivers;

a transmitter reference clock switch for switching one of the two generated transmitter reference clocks;

a receiver reference clock switch for switching one of the two generated receiver reference clocks; and a transmitter/receiver reference clock switch for receiving an output of the transmitter reference clock switch and an output of the receiver reference clock switch and switching one of the received outputs.

* * * * *